Figure 3:
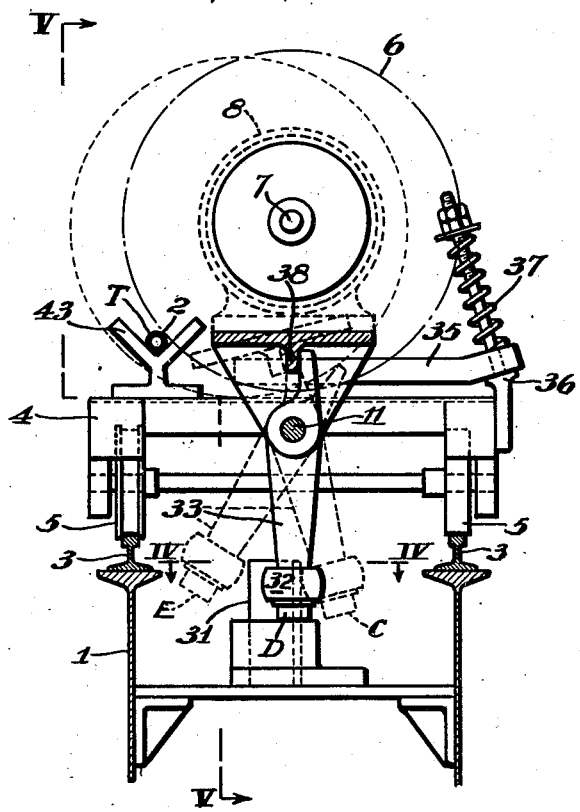

Feb. 13, 1934.  J. M. BARTON  1,946,926
FLYING SAW
Filed Feb. 24, 1931   3 Sheets-Sheet 1
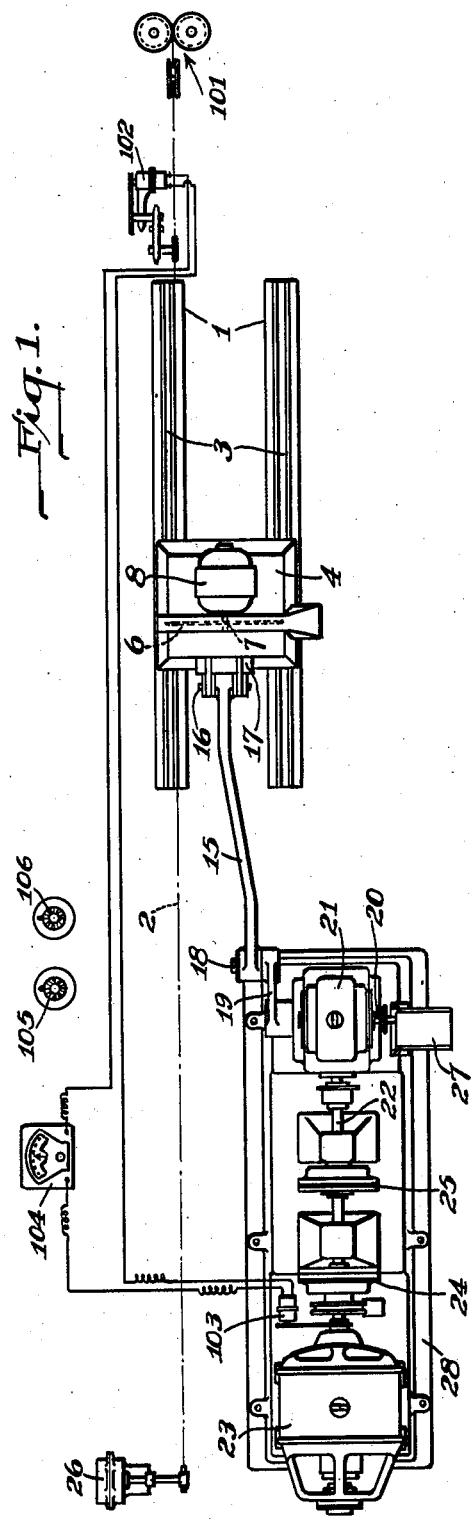
INVENTOR
James M. Barton
By Brown & Critchlow
his attorneys Feb. 13, 1934.    J. M. BARTON    1,946,926
FLYING SAW
Filed Feb. 24, 1931    3 Sheets-Sheet 2

WITNESSES
A. B. Wallace.
W. D. O'Connor

INVENTOR
James M. Barton
by Brown & Critchlow
his attorneys

Feb. 13, 1934.  J. M. BARTON  1,946,926
FLYING SAW
Filed Feb. 24, 1931  3 Sheets-Sheet 3
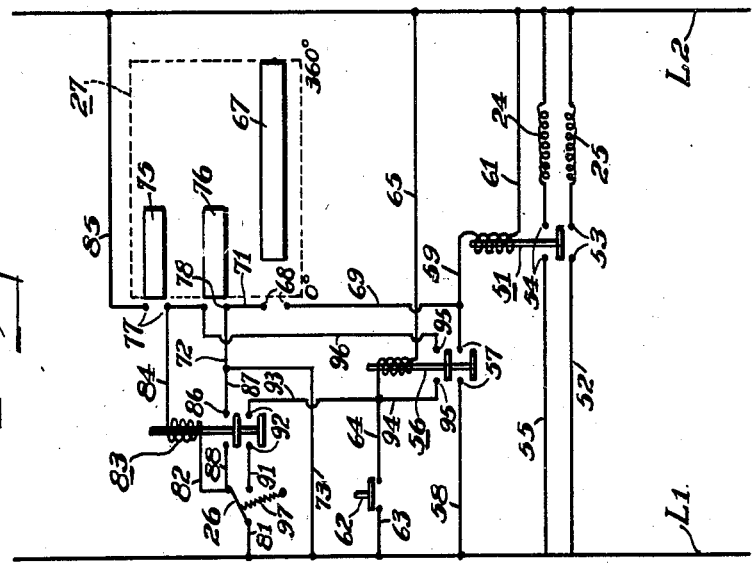
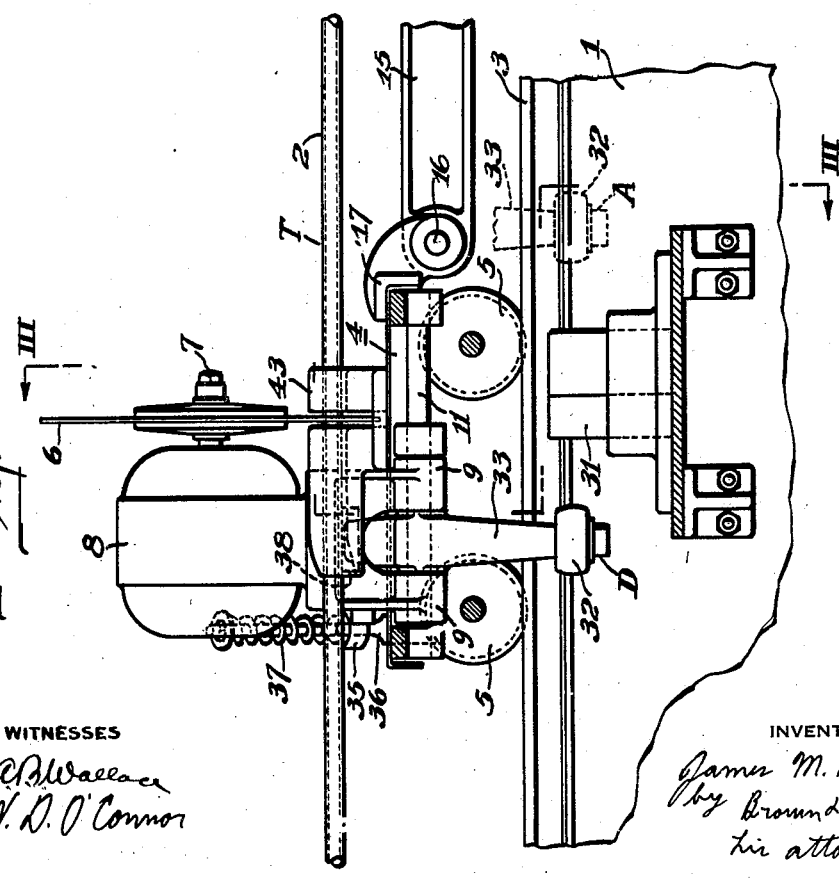
INVENTOR
James M. Barton
by Brown & Critchlow
his attorneys

UNITED STATES PATENT OFFICE 1,946,926

FLYING SAW

James M. Barton, Butler, Pa., assignor to Fretz-Moon Tube Company, Inc., Butler, Pa., a corporation of Pennsylvania Application February 24, 1931. Serial No. 517,852

1 Claim. (Cl. 29—69)

This invention relates, generally, to apparatus for cutting to predetermined lengths continuously moving tubing and particularly to means for synchronizing the movement of a tubing severing device with the moving tubing.

In the manufacture of tubing by a continuous process it is desirable to cut it to suitable commercial lengths soon after it is formed, and, in order to save space and time, the tubing should be cut off just as it issues from the mill. Inasmuch as it is very inconvenient, if not impracticable, to stop the mill each time a length of tubing is cut off, the cutting operation is performed while the tubing is moving longitudinally at its normal rate of advance.

The principal object of my invention is to provide a severing device that will function automatically to cut continuously moving tubing to predetermined lengths.

Another object of the invention is to provide means for measuring the relative velocity of the severing device and the tubing to be cut at the point at which the severing device is to engage the tubing.

A further object of the invention is to provide means for synchronizing the severing device with the tubing at a time other than when the severing device is in engagement with the tubing to be cut.

In accomplishing the foregoing objects, I utilize a severing device known as a flying hot saw that is provided with driving mechanism for moving the saw parallel with the direction of motion of the tubing and for simultaneously tilting it laterally into cutting engagement with the tubing. After the tubing is severed the mechanism withdraws the saw and returns it to its starting position automatically. A control system is provided actuated by the advancing end of the tubing, to cause the severing device to go through the cutting cycle. That the saw may move parallel with the tubing at the speed at which the tubing is advancing during the cutting operation, suitable indicating devices or tachometers are provided for measuring the speed of the tubing and the speed at which the saw engages it. The tachometers are connected to an indicating instrument which shows directly the relative speed of the tubing and the saw. Well known regulating devices are provided for changing the speed of movement of the saw or the speed of the advancing tubing to synchronize them in accordance with the showing of the instrument for determining their relative speed.

Figure 4:
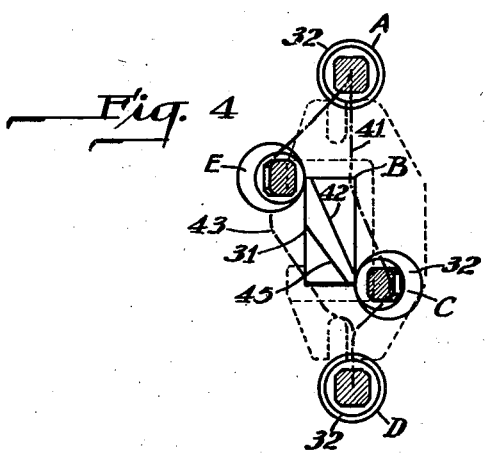

The foregoing and other objects, which will become apparent upon reading this specification in conjunction with the accompanying drawings, may be achieved by means of the particular apparatus shown in the various figures, of which Fig. 1 is a plan view of a tube severing device embodying my invention; Fig. 2 a view in front elevation of the tube severing device shown in Fig. 1; Fig. 3 an enlarged view partly in end elevation and partly in cross-section taken on the plane represented by the line III—III in Fig. 5 and showing the means for moving the severing device laterally into contact with the tubing; Fig. 4 a plan view partly in section taken on the plane represented by the line IV—IV of Fig. 3, and showing diagrammatically the cam and follower for moving the saw laterally; Fig. 5 a view, partly in elevation and partly in longitudinal section, taken on the plane represented by the line V—V of Fig. 3; and Fig. 6 a diagram of the electrical control circuit utilized in conjunction with the severing device.

Referring more particularly to the drawings, the tube severing device shown comprises a supporting framework or base 1 disposed parallel with and adjacent to the center line of pass 2 (indicated by the broken line 2) of a mill for forming tubing by a continuous process. The upper surface of the base 1 is provided with parallel rails 3 disposed to support a longitudinally movable saw carriage 4 having rail engaging wheels 5. The carriage 4 is for movably supporting a severing device or rotary hot saw 6 mounted on the end of an armature shaft 7 of a suitable electric motor 8. The motor 8 and the directly connected saw 6 are disposed on the carriage 4 with the armature shaft 7 parallel with the line of pass 2. To provide for moving the saw 6 laterally across the line of pass 2 to cut through the tubing the motor 8 is pivotally mounted on the carriage 4 by means of trunions or bearing lugs 9 which are rotatably mounted or journaled on a shaft 11 secured in the carriage 4 and disposed parallel with the armature shaft 7 and the line of pass 2.

Inasmuch as the tubing advances continuously from the mill at a substantially constant speed, it is necessary to move the saw 6 and its supporting carriage 4 longitudinally at a speed equal to the speed of the tubing during the time that the saw is cutting through the tubing. The mechanism for moving the carriage 4 and the saw 6 longitudinally comprises a connecting rod 15 journaled on a gudgeon pin 16 in a bracket 17 at one end of the carriage 4. At its other end the connecting rod 15 is journaled on a crank pin 18 constituting part of a crank 19 carried on the end of a transverse shaft 20 of a worm gear speed reducing mechanism 21. The speed reducing mechanism 21 is operated by a shaft 22 which may be connected to an electric driving motor 23 by means of a magnetic clutch 24. A magnetic brake 25 is provided for holding the shaft 22 stationary during the time that the clutch 24 is not engaged.

In performing a cutting operation, the mechanism is placed in the position shown in Figs. 1 and 2 with the motor 8 on the saw 6 operating at its normal speed and with the motor 23 operated at a predetermined speed to enable it to move the carriage 4 parallel to the line of pass 2 at a speed substantially equal to the speed of the tubing to be cut. When a predetermined length of tubing has advanced past the saw 6, its end engages a flag switch 26 disposed at a predetermined position in the line of pass 2 for the purpose of initiating the cutting operation at the proper time to cut the tubing to the desired lengths. When the flag switch 26 is actuated it causes the magnetic brake 25 to be released and the magnetic clutch 24 to be engaged by means of a control system, presently to be explained, to connect the motor 23 to the shaft 22 for actuating the speed reducing mechanism 21.

As may be seen from the drawings, when the speed reducing mechanism 21 is actuated the crank 19 draws the carriage 4 forwardly by means of the connecting rod 15 as it turns through the first half of a revolution and, during the second half of the revolution, the carriage 4 is returned to its initial position. At this point a limit switch 27, operatively connected to the transverse shaft 20 of the speed reducing mechanism 21, functions through the control system to disengage the clutch 24 and to engage the brake 25 for stopping the device. As shown, motor 23 and speed reducing mechanism 21 are preferably mounted on a rigid base 28.

To cause the saw 6 to move laterally across the line of pass 2 at the proper time during the forward motion of the carriage 4, a stationary cam 31 is provided within the base 1 and beneath the carriage 4 for engaging a cam follower or roller 32 on the end of an arm 33 depending from the carriage 4. As best shown in Figs. 3 and 5, the arm 33 is journaled near its upper end on the longitudinal shaft 11 in the carriage 4 between the lugs 9 which support the motor 8 on this shaft. As shown in Fig. 3, the motor 8 is held in its normal upright position by an arm 35 extending laterally from the motor base, and is held in engagement with a stop member 36 by means of a compression spring 37. The upper end of the pivoted arm 33 is provided with an extending portion for engaging a depending lug 38 on the base of the motor 8 in such manner that the arm 33 may be utilized to tilt the motor 8 and saw 6 laterally across the line of pass 2 against the resistance of the compression spring 37.

As shown diagrammatically in Fig. 4, the cam follower 32 at the lower end of the arm 33 is in the position indicated at A relative to the stationary cam 31 when the apparatus is in its normal stationary position shown in Figs. 1 and 2. When the carriage 4 moves forwardly during the first portion of the cutting cycle, the follower 32 moves along the path indicated by the broken line 41 in Fig. 4, during which time the arm 33, motor 8 and saw 6 remain in the upright position. By the time the crank 19 has turned sufficiently far to bring the carriage 4 to a speed substantially equal to the speed of the tubing to be cut, the cam follower 32 arrives at position B and engages a sloping face 42 of the cam 31. The cam follower 32 is deflected to the right, as shown in Figs. 3 and 4, by the sloping face 42 of the cam 31 as it follows the line 41 from position B to position C.

As the cam follower 32 moves to position C (Fig. 3) the arm 33 and the motor 8 assumes the tilted position shown by the dotted lines, and the saw 6 moves across the line of pass 2. While the cam follower 32 is moving from position B to position C, carriage 4 continues to move at a speed closely approximating that of the advance of the tubing. The tubing to be cut is carried in a V-shaped guide or trough 43 on the carriage 4, as indicated by the reference character T in Figs. 3 and 5. Inasmuch as the saw 6 and the tubing T are moving longitudinally at equal speeds, the saw 6 cuts through the tubing as it is tilted across the line of pass 2 in the same manner as it would if the tubing were stationary and the saw not moving longitudinally.

After arriving at the position C, the cam follower 32 slips off the end of the cam 31, and the spring 37 returns the saw 6 to its inactive position for the remainder of the stroke. After the follower 32 becomes disengaged from the cam 31, the speed of carriage 4 is reduced by reason of the fact that the crank 19 is approaching its dead center position opposite to the position shown in Figs. 1 and 2, and the cam follower 32 finally comes to rest momentarily at the position D at the end of the stroke.

During the return stroke it is desirable that the motor 8 be held in its upright position without being influenced by the stationary cam 31. To accomplish this the side of the cam 31 opposite to the sloping face 42 is provided with a somewhat abrupt sloping face 45, which engages the cam follower 32 as it moves along a return path 43 and deflects it to the left to position E during the return stroke. As shown in Fig. 3, when the follower 32 moves to the position E the arm 33 turns on the shaft 11 in such direction as to move its upper end out of engagement with the lug 38 on the motor 8, and consequently the motor remains in its upright position with the arm 35 held in contact with the stop 36 by the spring 37. During the last portion of the stroke the cam follower 32 moves from position E to its initial position A as the crank 19 is brought to a stop at the dead center position by the limit switch 27.

The control system connecting the limit switch 27 and the flag switch 26 to the magnetic brake 25 and the magnetic clutch 24 is shown in detail in Fig. 6. In the lower portion of the diagram are shown actuating coils which represent, respectively, the magnetic clutch 24 and the magnetic brake 25. The clutch 24 and the brake 25 are disposed to be connected alternately for energization across a power source, represented by line conductors L—1 and L—2, by means of a double-throw electrically operated switch 51. When the mechanism is in the position of rest shown in Figs. 1 and 2, clutch 24 is deenergized and disengaged, and the brake 25 is held on by reason of the fact that its actuating coil is energized through a circuit that may be traced from the line conductor L—1 through a conductor 52 to contact members 53 which are closed by the switch 51, thence through the actuating coil of the brake 25 to the line conductor L—2.

To start the cutting cycle, it is necessary to energize the actuating coil of the switch 51 to move it in such manner that it will become disengaged from the contact members 53, thereby opening the circuit through the actuating coil of the brake 25, and that it will engage another pair of contact members 54 for establishing a circuit through the actuating coil of the clutch 24. The circuit through the clutch 24 may then be traced from line conductor L—1 through a conductor 55, the contact members 54 bridged by the switch 51, the actuating coil of the clutch 24, and thence to the line conductor L—2.

To initiate the cutting cycle, the actuating coil of the switch 51 may be energized by means of a relay 56 having lower contact members 57 which establish a circuit, when bridged, that may be traced from the line conductor L—1 through a conductor 58, the bridged contact members 57, conductor 59, the actuating coil of the switch 51, and thence through a conductor 61 to line conductor L—2. The initiation of the cutting cycle may be effected manually by means of a push button switch 62, which establishes an energizing circuit through the actuating coil of the relay 56 that may be traced from the line conductor L—1 through a conductor 63, the switch 62, a conductor 64, the actuating coil of the relay 56, and thence through a conductor 65 to the line conductor L—2. It is clear that when the switch 62 is closed the relay 56 is energized and closed to bridge the contact members 57 to in turn establish a circuit through the actuating coil of the switch 51 and move it upwardly to deenergize the brake 25 and energize the clutch 24.

After the cycle is started, the push button switch 62 is held closed until the cam limit switch 27 (a development of which is shown in the upper portion of the diagram) turns to a position in which a contact segment 67 bridges contact members 68 and establishes an independent circuit through the actuating coil of the switch 51 that may be traced back from the line conductor L—2 through conductor 61, the actuating coil of the switch 51, conductor 59, thence by a conductor 69 to the contact members 68 bridged by the segment 67, and thence by conductors 71, 72 and 73 to the line conductor L—1. If the relay 56 is now deenergized as by releasing the push button 62 it will drop out and open the circuit through the contact members 57, but the actuating coil of the switch 51 remains energized by reason of the circuit established through the segment 67 of the limit switch 27.

After the crank 19 has completed one revolution, during which the carriage 4 has made a forward and a return stroke and the tubing T has been severed by the saw 6, the limit switch 27 will be turned to a position in which the contact segment 67 becomes disengaged from the contact members 68, thereby opening the circuit through the holding coil of the switch 51. The switch 51 will then drop to the position shown in the diagram in which the circuit through the contact members 54 and the clutch 24 is broken and the circuit through the contact members 53 and the brake 25 is established to disconnect the motor 23 from the remainder of the saw operating mechanism and bring the saw carriage 4 to a stop.

At the time that the segment 67 on the limit switch 27 disengages the contact members 68, two other segments 75 and 76 on the limit switch 27 bridge cooperating contact members 77 and 78, respectively, for establishing circuits to enable the cuting cycle to be initiated automatically by the flag switch 26. As shown in the diagram, when the mechanism is ready for automatic operation the flag switch 26 is in its upper or clear position.

When in the upper position the flag switch 26 establishes a circuit that may be traced from the line conductor L—1 through a conductor 81, the flag switch 26, a conductor 82, the actuating coil of an interlocking relay 83, thence by a conductor 84 to the contact members 77 bridged by the segment 75 and a conductor 85 to the line conductor L—2. As soon as the relay 83 is energized by reason of the flag switch 26 moving to its clear position, and the segment 75 being in position to bridge the contact members 77, the relay 83 closes and establishes a holding circuit by means of its upper contact members 86 that may be traced from the line conductor L—1 through the conductor 73, a conductor 87 to the contact members 86 bridged by the relay 83, and thence by a conductor 88 to the conductor 82, the actuating coil of the relay 83, conductor 84, contact members 77 and conductor 85, to the line conductor L—2.

When the relay 83 is thus closed and held in the closed position by the holding circuit, the system is in readiness to be automatically actuated to sever tubing to predetermined lengths as it issues from the mill. As hereinbefore explained, the flag switch 26 is so positioned in the line of pass 2 that it is engaged by the end of the tubing T when a predetermined length of tubing has passed the saw 6. When the flag switch 26 is engaged it is moved by the tubing to its lower position, as seen in Fig. 6, to establish a circuit similar in function to that established by the push button switch 62. This circuit may be traced from the line conductor L—1 through the conductor 81, the flag switch 26, and a conductor 91, to lower contact members 92 bridged by the closed relay 83, thence by a conductor 93 to the conductor 64, the actuating coil of the relay 56, and thence by conductor 65 to the line conductor L—2. As explained with regard to the circuit established by the push button 62, the relay 56 when energized establishes a circuit that energizes the actuating coil of the switch 51 and causes the switch 51 to deenergize the brake 25 and energize the clutch 24 to start the cutting cycle.

As soon as the relay 56 is energized it establishes a holding circuit that may be traced from the line conductor L—2 through conductor 65, the actuating coil of the relay 56, conductor 64, and a conductor 94 that connects to one of the upper contact members 95 of the relay 56, through the relay 56 to the other contact member 95, thence by a conductor 96 to the contact members 78 bridged by the contact segment 76 of the limit switch 27, and thence by conductors 72 and 73 to line conductor L—1. The relays 83 and 56 are now both held closed by holding circuits which pass through the contact segments 75 and 76, respectively, of the limit switch 27, and are no longer in any way affected by the flag switch 26. Hence the subsequent operation of the mechanism is the same regardless of whether the flag switch 26 is held down continuously or is permitted to return to its upper clear position.

As the cycle progresses and the limit switch 27 turns with the crank 19, its lower contact segment 67 engages and bridges the contact members 68 to establish the independent circuit through the actuating coil of the switch 51, as hereinbefore explained. After this independent circuit has been established the mechanism must necessarily continue to operate until the contact segment 67 becomes disengaged from the contact members 68, which occurs at the end of one complete revolution of the crank 19.

If we assume the flag switch 26 to be held down continuously by a length of tubing which has been severed by the saw 6, it will be seen that when the limit switch 27 has turned to such position that the contact segments 75 and 76 become disengaged from the contact members 77 and 78, respectively, the holding circuits for the relays 83 and 56 will be broken, and both of the relays will drop out to their open positions. As the cycle is continued until stopped by reason of the contact segment 67 becoming disengaged from the contact members 68, the contact segments 75 and 76 will again engage the contact members 77 and 78 at the end of the cycle. However, no circuit will be established inasmuch as the relays 83 and 56 are both open and the flag switch 26 is still depressed to its lower position by the piece of tubing which has just been cut off by the saw 6. For the relay 56 to close, it is necessary that the relay 83 be closed first to establish an energizing circuit through the contact members 92, and to close the relay 83 the switch 26 must first move to the upper position and make contact with the conductor 82. Consequently the mechanism remains stationary in spite of the fact that the flag switch 26 is depressed to its lower position.

As soon as the severed piece of tubing has been removed, the flag switch 26 is returned to its clear or raised position by the spring 97 and establishes what may be termed the "ready" circuit from line conductor L—1 through conductor 81, switch 27, conductor 82, the actuating coil of the relay 83, conductor 84, contact members 77, and conductor 85 to line conductor L—2. The relay 83 is then closed and held in the closed position by its holding circuit through the contact members 86 independently of the circuit through the flag switch 26, as hereinbefore explained. With the relay 83 thus closed and held, its lower contact members 92 are bridged and the system is in condition to perform another cutting cycle automaticadlly as soon as the tubing has advanced to such position that its end engages the flag switch 26 and moves it to its lower or closed position.

It is apparent that, in order to operate effectively, the mechanism must be adjusted to move the saw 6 longitudinally during the cutting stroke at a speed closely approximating the speed of advance of the tubing T. To determine in advance whether or not the longitudinal speed of the saw will be correct, I provide means for measuring the speed of advance of the tubing T as it comes from the last rolls 101 of the mill, and also provide means for measuring the speed of rotation of the armature of the motor 23 for driving the mechanism that moves the saw carriage 4 to determine the speed of the carriage when it moves through the cutting zone.

As shown in Figs. 1 and 2, a tachometer 102, preferably of the electrical type, is disposed adjacent to the rolls 101 and engages the moving tubing as it issues from the rolls to measure its speed. A second electrical tachometer 103 is operatively connected to the shaft of the motor 23 and is responsive to the speed of the motor. Both the tachometer 102 and the tachometer 103 are connected differentially to a speed indicating instrument 104 in such manner that when either tachometer is operated alone the indication of the instrument 104 represents the speed of the device to which the tachometer is connected. However, if both tachometers are operated at once the instrument 104 indicates the difference in the speeds recorded by them. Consequently when tubing is issuing from the rolls 101 and the motor 23 is stationary the instrument 104 indicates the speed of advance of the tubing T. But when the motor 23 is started the instrument 104 then indicates the difference between the speed of advance of the tubing T and the speed at which the saw carriage 4 is moved by the motor 23 during the cutting stroke. Inasmuch as the speed of the saw carriage 4 should equal the speed of the tubing T during the cutting operation or, in other words, their relative speed should be zero, it is simply necessary to so regulate the speed of the motor 23 or the speed of the rolls 101 that the differential speed indicating instrument 104 indicates zero to effect the proper speed relation between the saw and the tubing. To accomplish the synchronization of the advancing tubing T and the saw carriage 4, suitable control devices, such as rheostats 105 and 106, are connected in any well known manner, not shown, to control the speed of the motor 23 and the speed of the rolls 101 respectively. For convenience in operation, the rheostats 105 and 106 and the differential speed indicator 104 may be mounted on a control panel, not shown, in such manner that the instrument 104 may be observed while manipulating the rheostats.

From the foregoing description and explanation of the functioning of a specific device embodying my invention, it is apparent that I have provided a rugged and effective apparatus for automatically cutting continuously moving tubing to predetermined lengths, and an apparatus which is adapted to be readily regulated to conform with the speed of the advancing tubing.

Although I have shown and described only one specific embodiment of the invention, it will be apparent to others skilled in the art to which this device belongs that various modifications may be made in the driving mechanism and other details of construction without departing from the spirit and scope of my invention as defined in the appended claim.

I claim as my invention:

A flying saw comprising a carriage, a motor for moving the carriage, a magnetic clutch disposed to connect the motor to the carriage, a magnetic brake connected to stop the carriage, a tubing guide disposed parallel to the direction of motion of the carriage, means for indicating the relative speeds of the carriage and of tubing in the guide, means for regulating the motor to synchronize the carriage with the tubing, a saw pivotally mounted on the carriage, means for tilting the saw into cutting engagement with the tubing, and a control system coordinated with the carriage-moving means for releasing the brake and engaging the clutch to cause the carriage to move and the saw to cut the tubing, said control system operating to so actuate the saw that the tubing is cut to predetermined lengths.

JAMES M. BARTON.